United States Patent [19]

Schleicher et al.

[11] Patent Number: 4,969,681
[45] Date of Patent: Nov. 13, 1990

[54] FRAME ARRANGEMENT FOR A VEHICLE ROOF

[75] Inventors: Bernd Schleicher, Munich; Alfons Lutz, Emmering; Hans Jardin, Inning; Karl Dworschak, Munich; Peter Wolf, Neuss, all of Fed. Rep. of Germany

[73] Assignee: Webasto AG Fahrzeugtechnik, Stockdorf, Fed. Rep. of Germany

[21] Appl. No.: 481,818

[22] Filed: Feb. 20, 1990

Related U.S. Application Data

[63] Continuation of Ser. No. 233,452, Aug. 18, 1988, abandoned.

[30] Foreign Application Priority Data

Aug. 20, 1987 [DE] Fed. Rep. of Germany ....... 3727720

[51] Int. Cl.$^5$ .............................................. B60J 7/057
[52] U.S. Cl. ..................................... 296/223; 296/216
[58] Field of Search ........................ 296/216, 221-223

[56] References Cited

U.S. PATENT DOCUMENTS

| | | | |
|---|---|---|---|
| 3,290,087 | 12/1966 | Werner | 296/223 X |
| 3,822,912 | 7/1974 | Bienert | 296/223 |
| 4,293,161 | 10/1981 | Lutz | 296/213 |
| 4,332,416 | 6/1982 | Lutz et al. | 296/216 |
| 4,671,565 | 6/1987 | Grimm et al. | 296/216 |
| 4,749,227 | 6/1988 | Bienert et al. | 296/221 |
| 4,752,099 | 6/1988 | Roos et al. | 296/223 |

FOREIGN PATENT DOCUMENTS

| | | | |
|---|---|---|---|
| 2046996 | 7/1977 | Fed. Rep. of Germany | 296/222 |
| 2836801 | 3/1980 | Fed. Rep. of Germany | 296/223 |
| 3532103 | 3/1987 | Fed. Rep. of Germany | |

*Primary Examiner*—Dennis H. Pedder
*Attorney, Agent, or Firm*—Sixbey, Friedman, Leedom & Ferguson

[57] ABSTRACT

A frame arrangement for a vehicle roof that has a roof opening that is closable by a displaceable cover panel that, along with driving and guiding components thereof, is supported on a frame bounding the roof opening which has only the function of a support, i.e., does not form a necessary part of a fully functional installation unit, comprising a guide insert and a covering. The guide insert and the covering form the tracks for a slidable guide element and the cable guide channels for actuating cables, which interact with an appropriately suitable actuation device for displacing the cover panel. The guide insert can be made of plastic or metal, and the covering is advantageously divided into a front side section and side sections. These sections of the covering can be uniformly produced of plastic or metal or individual sections can be produced of plastic and others, in turn, of metal. Also, the guide insert as well as the covering can be produced entirely of plastic. Further, the guide insert can also form a guide for a sliding internal headliner panel.

20 Claims, 3 Drawing Sheets

FRAME ARRANGEMENT FOR A VEHICLE ROOF

This application is a continuation of Ser. No. 233,452, filed Aug. 18, 1988, now abandoned.

BACKGROUND OF THE INVENTION

The invention relates to a frame arrangement for a vehicle roof that has a roof opening that can be closed by a cover panel, which is slidably and/or swingably displaceable to at least partially uncover the roof opening, and which is supported by a frame perimetrically bounding the roof opening. In particular, to such an arrangement wherein at least one guide element is disposed at each side of the cover panel and along which the cover panel is longitudinally slidable on tracks provided on side parts of the frame by a respective actuating cable that is guided in a cable channel and connected to an actuating device, and wherein a cover rail is used to form the cable guide channel and/or the tracks.

From German Offenlegungsschrift No. 35 32 103 and U.S. Pat. No. 4,749,227 frame arrangements for a vehicle roof of the above-mentioned type are known. In these known arrangements, the frame is provided with grooves that form a part of the cable guide channels. Connected to the frame, over these grooves constructed in the frame, is a cover rail which closes the open sides of the grooves to form cable guide channels that are closed on all sides. This cover rail extends beyond the grooves in the frame to form laterally running tracks for the guide element or elements of the cover in conjunction with an appropriate guide surface that is constructed on the frame. Also, in the case of the arrangement of German Offenlegungsschrift No. 35 32 103, at the transitions between the laterally provided cover rails and the separate front part misalignment unavoidably occurs, even if usually slight, between the grooves provided in the frame for the guide channels of the actuating cable, so that, because of this circumstance, a stiffness of the actuation and sometimes an undesirable production of noise may result. Furthermore, since these frame arrangements have the tracks and/or cable channels constructed directly in the frame, the frame must be provided together with the remainder of the assembly comprised of the cover and its drive components, i.e., cannot be a separate unit manufactured by a supplier to be applied to a frame separately produced by the vehicle manufacturer.

A vehicle roof is known from U.S. Pat. No. 4,293.161 that has a frame consisting of plastic which, on the one hand, has sliding surfaces for the guide elements or guide shoes for the cover panel and, on the other hand, guide channels for the actuating cable. Here also, the grooves in the frame partially define the guide channels for the actuating cable and are covered by covers which, simultaneously, form, on the side parts of the frame, a sliding surface for the guide shoes. In this case, essentially the same or similar difficulties occur as in the above-mentioned arrangements.

From U.S. Pat. No. 3,822,912, a cable drive and guide for a sliding cover panel of a vehicle roof is known, wherein a sheet metal part is fastened to the frame as a covering that forms, in conjunction with a suitably constructed profile of the frame and another sheet metal part fastened to the frame, a guide channel or channels for the actuating cable, and tracks for the guide elements of a suitable extension of the cover panel. Nothing is indicated as to the manner in which the actuating channels are guided at the front of the roof opening. With this configuration, at least three interacting parts are, thus, needed for the formation of the tracks and the cable channels, by which the assembly is made more difficult and production becomes more expensive, and since the guide channels for the actuating cables are defined at least in part by the frame, the construction of the frame must be adapted to the path of these guide channels.

In U.S. Pat. No. 4,332,416, a vehicle roof is disclosed in which the guide channels with the incorporated actuating cables and the tracks with the incorporated guide elements are combined into an installation unit which can be preassembled and which is then set into a frame perimetrically bounding the roof opening. Since this installation unit contains all the operational parts of the sliding roof (except for the frame), the operational testing can take place right before installation. However, in this arrangement there are, again, transition areas from the side parts to the front side that are subject to potential misalignment problems.

SUMMARY OF THE INVENTION

Thus, a primary object of this invention is to overcome the difficulties described above in a manner providing a frame arrangement for a vehicle roof of the above-described type in which, in a way that is simple from a structural and manufacturing engineering viewpoint, a quiet functioning as well as a smooth and reliable actuating and guiding of the guide elements of the slidable cover is made possible. In particular, it is a particular object to achieve such effects in such a way that the parts belonging to the movement mechanism, such as the tracks, the cable guide parts and the like can be combined into a functional sub-unit that can be handled independently of the frame, so that the frame has only a support and holding function.

According to the invention, for this purpose a frame arrangement for a vehicle roof of the initially described type is distinguished in that a guide insert is provided which can be inserted into suitable recesses of the frame, and which, in the area of the side parts of the frame, forms at least one part of the guide channel and at least one sliding surface of the tracks for the guide element and which, in the area of the front side of the frame, forms, at least partially, two adjacent guide channels and which, on the corner areas, also forms, at least partially, channels for the trailing end sections of the guide cables. This guide insert extends in one piece over the side parts and the front side of the frame.

In the configuration according to the invention, there are thus no transitions, in the area of the guide insert, on the guide channels for the actuating cables constructed in the guide insert, so that the actuation of such a roof is smooth and quiet. Further, according to the invention, the guide insert is constructed of a monocoque or modular construction and a completely functional actuation unit is obtained, in combination with the covering which is connected to the guide insert, so that the two-sided tracks for the guide elements and the guide channels, in conjunction with the covering and guide insert, are formed in a closed style.

According to an advantageous development according to the invention, the covering that works with the guide insert is divided into a front side section with corner portions and opposite side sections. Thus, the actuating cables and the entire actuating mechanism and also the guide elements can easily be incorporated into the allocated guide channels and tracks. Suitably, the side sections of the covering are configured so that it simultaneously forms the opposite sliding surface of the tracks.

As a function of an appropriate design of these side sections of the covering, a link pin for the cover pivoting mechanism may also be integrated, as an insert, in these side sections of the covering, so that the assembly is simplified by the use of few parts.

As a function of the stresses that must be borne by the guide insert and/or the coverings, all or some of the sections of the covering can be constructed as a sheet metal part or may be formed of plastic. Preferably, to achieve manufacturing simplification and weight saving, the guide insert is produced completely of plastic, preferably a thermoplastic, and in particular of a sheet molding compound. With such a construction, a complicated design can be achieved with the desired manufacturing precision.

To reduce the number of additional parts requiring assembly, safety detents and/or lateral facings and/or a catch projection can be provided on the covering.

When the covering, in the frame arrangement according to the invention, is formed totally of plastic or at least of plastic parts, such as, for example, the side sections, then, in accordance with the invention, a metal part is used which, for example, forms the top sliding surface of the tracks. This metal part can be constructed as a flat sheet metal part and can be placed between the covering or sections of the covering and the guide insert. In this way, a stiffening of the tracks for the guide elements is obtained in the frame arrangement according to the invention, so that the guide elements can move smoothly and without tilting in the tracks. Advantages also result with regard to wear when at least one sliding surface of the tracks is metallic.

To additionally stiffen the guide insert when it is formed of plastic, according to an advantageous design according to the invention, a stiffening rib is provided on the guide insert which is, preferably, formed on the guide insert and braced on the frame. This stiffening rib is suitably provided in the areas of the guide insert where only a single guide channel for the actuating cable is present, i.e., in the area of the side parts of the frame. This stiffening rib faces away from the tracks and simultaneously acts, for example, as a guide for a sliding inside roof headliner panel.

A further embodiment of the frame arrangement according to the invention is distinguished in that the guide insert consists entirely of metal and is, preferably, produced and formed of sheet metal. When such a guide insert made of metal is attached on the frame, potential difficulties which could result if the guide insert is made of plastic, due to the differing thermal expansion characteristics of plastic and metal, can be avoided. In this way, stresses between the frame and the guide insert, caused by the abovementioned factors, can be avoided. Further, such a guide insert consisting of metal can also, for example, be clipped onto the frame with any kind of suitable means so that it can be mounted on the frame independently of the covering.

The above-indicated combinations of materials are, of course, not exclusive and further combinations of materials are also possible. In particular, with a configuration of the guide insert of plastic, sufficient design freedom for the insert is achieved to enable the insert to be adapted to the respective requirements desired without difficulties. Further, the configuration according to the invention makes it possible that, for example, when desired by the vehicle manufacturer, the vehicle manufacturer can incorporate the frame into the roof opening provided in the roof of the vehicle on the vehicle assembly line and then the installation unit of functional components assembled with the guide insert and covering is subsequently put into the frame and solidly connected to it. By suitable allocation of recesses in the frame, which can optionally be configured of multiple parts, the arrangement of the guide insert and covering combined into a functional installation unit can be incorporated in a space-saving way in the frame, and the functional unit can be mounted quickly and simply on the frame without impairing the operability of the actuation device.

Developments related to those disclosed herein are disclosed in our co-pending, commonly assigned U.S. patent application filed on even date herewith, based on German Application No. P 37 27 719.7.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
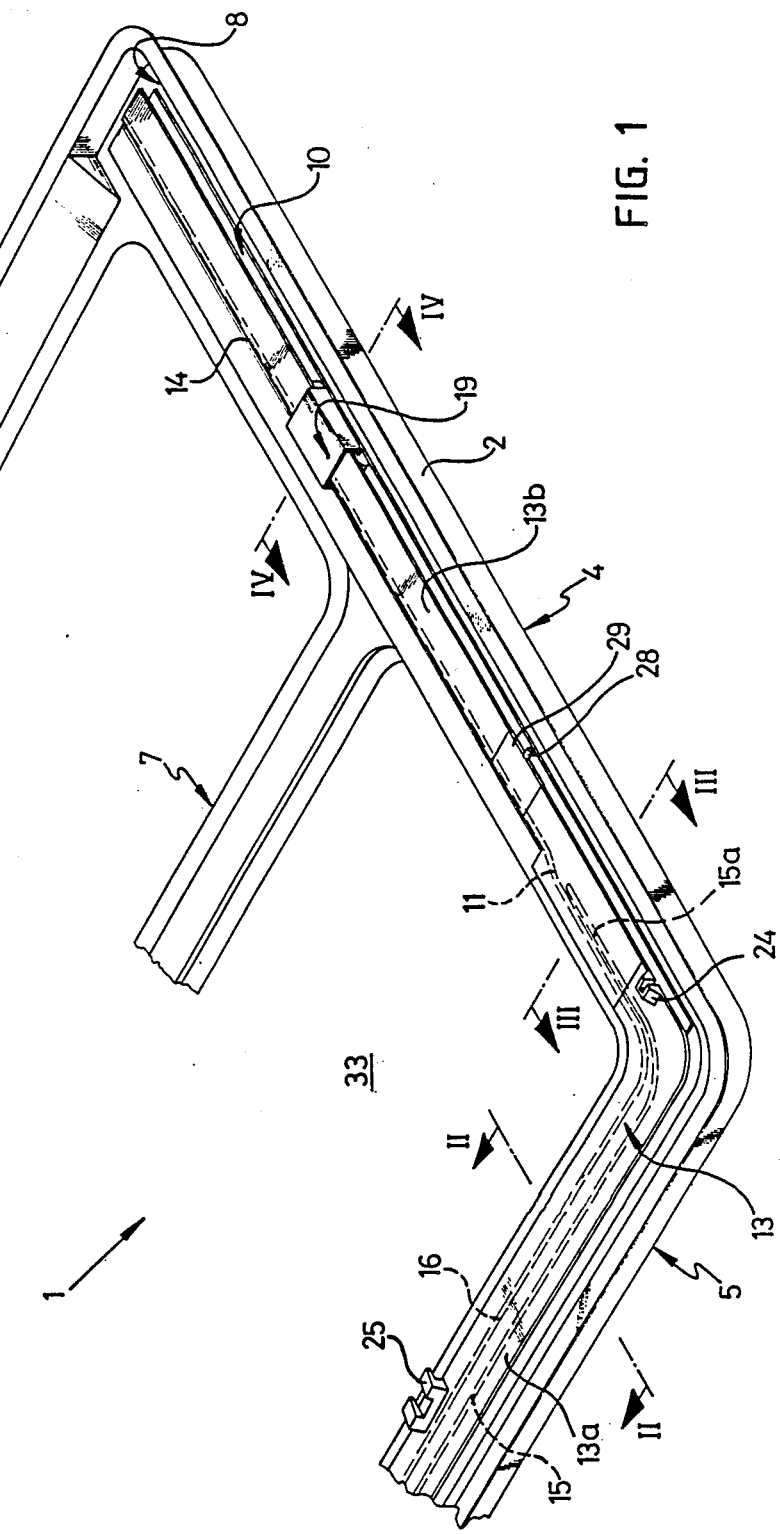
FIG. 1 is a perspective cutaway view of a frame arrangement according to the invention.
Figure 2:
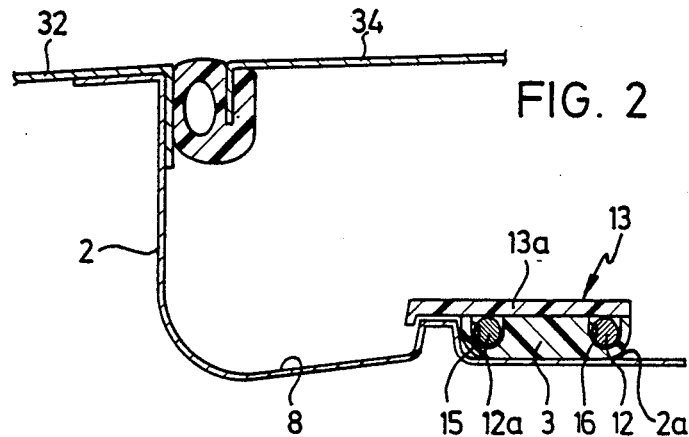
FIGS. 2 to 4 show corresponding sectional views taken along lines II—II, III—III and IV—IV, respectively, in FIG. 1.

In the embodiment represented in FIGS. 1 to 4, the frame arrangement is designated, overall, by 1. Frame arrangement 1 comprises a frame 2 and a guide insert 3. In the example represented, frame 2 consists of a sheet metal part and the latter is on a vehicle fixed roof surface 32 so as to extend along the border of a roof opening formed in fixed surface 32. An aperture 33 of frame 2 is aligned below the roof opening.

Frame 2 has side parts 4 (only the one on the right is shown in FIG. 1), a front side 5 and a rear side 6. A transversely extending reinforcement 7 is provided between front side 5 and rear side 6. In the example represented, a drip molding 8 is formed in the outer area of frame 2 by providing frame 2 with a raised edge. Frame 2 has only a support function and has recesses 2a in which guide insert 3 is suitably inserted in a mating relationship. Guide insert 3 forms a sliding surface 9, specifically the lower one, of tracks which are designated, overall, by numeral 10. Tracks 10 are provided on the opposite longitudinally extending side parts 4 of frame arrangement 1. Since the other side of frame arrangement 1, i.e., that having the left side of frame 2 and guide insert 3 that are not shown in the drawing, is constructed as a mirror image of the part represented, only a side part 4 and a part of front side 5 will be explained in more detail.

In the embodiment represented in FIGS. 1 to 4, guide insert 3 is formed of plastic, such as, for example, of sheet molding compound (SMC). Guide insert 3 has a guide channel 11 for a diagrammatically represented actuating cable 12 in side parts thereof. In the area of guide insert 3 corresponding to front side 5 of frame 2, two adjacent guide channels 15 and 16 are provided. In this area, actuating cables 12 and 12a work for the actuation and adjustment of cover 34 together with a conventional actuation device, likewise not further represented. This actuation device can consist of a manual drive or a motor drive with a drive pinion received between cables 12, 12a to drive them in opposite directions as it rotates. Further, in guide insert 3, guide channels 11, 15 and 11, 16 are constructed so that they have no crossovers, i.e., guide channels 11, 15 do not cross channels 11, 16. For this purpose, in guide insert 3, on the corner areas at the transition between front side 5 and side parts 4, guide channel sections 15a are constructed for the trailing ends of actuating cables 12, 12a.

A covering designated, overall, by numeral 13 is provided on guide insert 3 for interacting with it. Covering 13 is in the form of a cover rail that is suitably divided into a front side section 13a, which includes a corner portion, and side sections 13b. As can be seen from FIG. 2, front side section 13a closes the top of guide channels 15, 16, which are constructed as recesses in guide insert 3.

Figure 3:
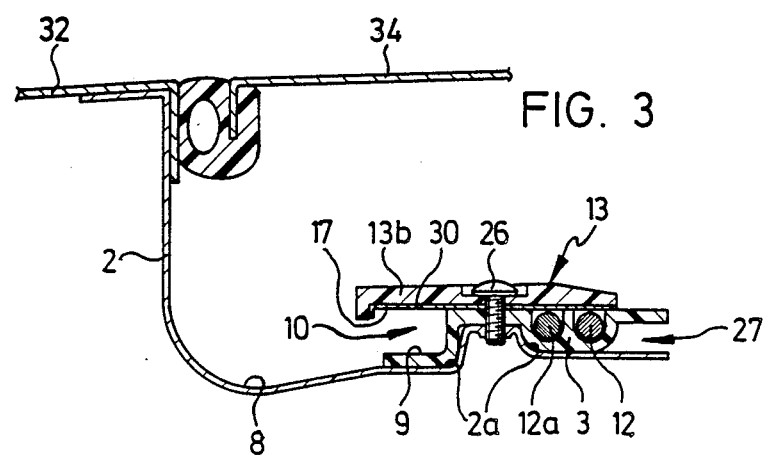
Figure 4:
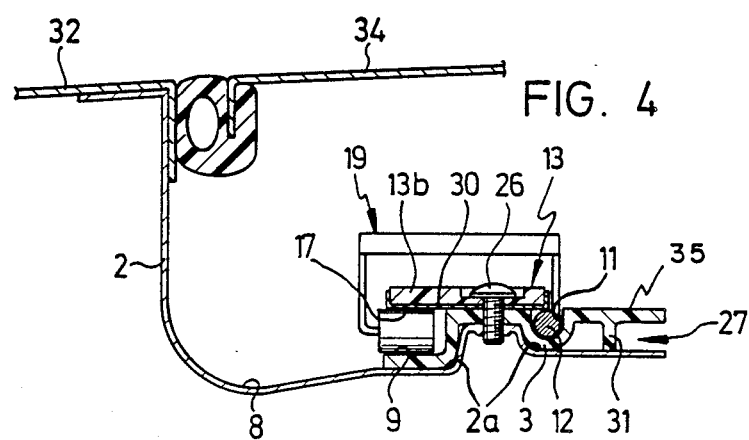

As can be seen from FIGS. 3 and 4, side sections 13b of covering 13 not only close the top of guide channels 11, 15 for actuating cables 12, 12a, but thereby, simultaneously, covering 13 also forms a track, designated overall by 10, in conjunction with opposite, lower sliding surface 9, i.e., covering 13 forms upper sliding surface 17 of a track in which at least one guide element 19, which, for example, may be constructed in the form of a conventional guide shoe, can move (FIGS. 1 and 4). Further, side sections 13b of covering 13 are formed with a longitudinal slit 14 through which a connection between the guide element or elements 19 and actuating cable 12 is produced. Actuating cable 12 is configured, for example, as a pressure-resistant threaded cable. Cover panel 34 is connected to guide element 19 and is moved along tracks 10 by the actuation device, not represented in more detail, by actuating cables 12, 12a in a suitable way. Since the construction of these guide elements 19 and the manner in which they are moved is conventional, a more detailed description thereof is unnecessary.

In the embodiment shown in FIGS. 1 to 4, not only does guide insert 3 consist of plastic, but also covering 13 with its sections 13a and 13b is made of plastic, suitably a thermoplastic, and in particular, of sheet molding compound (SMC). However, as will be explained in more detail below, other materials may be used. When covering 13 consists entirely of plastic or at least side sections 13b of covering 13 are produced of plastic, according to FIGS. 3 to 4, a metal part 30 is preferably provided that is placed between guide insert 3 and side sections 13b of covering 13. The overall arrangement, consisting of side section 13b of covering 13, part 30, and guide insert 3, is attached to frame 2 in any suitable way, for example, with the aid of screws 26. In the embodiment of FIGS. 3 and 4, metal part 30 is constructed as a flat sheet metal part and it forms top sliding surface 17 of tracks 10. With this metal part 30, a stiffening of tracks 10 is, thus, achieved so that a smooth sliding movement of guide element 19 is guaranteed.

As can be seen further from the sectional view according to FIG. 4, to stiffen and define a guide 27 for a sliding inside roof headliner (not represented), a stiffening rib 31 is provided on guide insert 3 which is suitably a molded-on portion of guide insert 3. This stiffening rib 31 bears directly on frame 2 and prevents an inward/-downward bending of the centrally protruding part 35 of guide insert 3. Alternatively, of course (although this is not represented in further detail) frame 2 could have a raised edge in this area, in which case guide insert 3 can sit on the raised edge so that the stiffening rib 31 can be omitted.

As can be seen further from FIG. 1, in the corner area on the top side of covering 13, in particular of front side section 13a of the latter, a safety detent 24 (similar to the stops 76, 77 of U.S. Pat. No. 4,749,227) is constructed that enables the cover panel to be kept reliably in the proper position. Further, in the area of front side section 13a of covering 13, about in the middle of it, a catch projection 25 can be formed that, likewise, interacts with the cover panel, when closed.

A guide pin 28, which interacts in the usual way with guide element 19 (such as in the manner of link pin 69 of U.S. Pat. No. 4,749,227), is configured according to FIG. 1 as an insert designated, overall, by 29 which, preferably, is formed of metal and which is directly embedded during the production of side section 13b of covering 13, so that this guide pin 28 is integrated within the plastic material of side section 13b of covering 13. Such an embodiment, of course, depends on the load capacity of side section 13b of covering 13, since this guide pin 28, during its interaction with guide element 19, is subjected to relatively high loads. In addition, such an embodiment is suitable only if at least side section 13b of covering 13 consists of plastic, so that the arrangement of the guide pin 28 with insert 29 can be taken into account during the production of covering 13.

Figure 5:
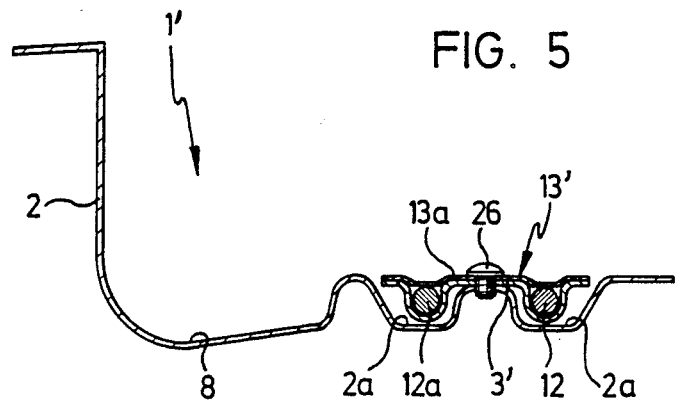
FIGS. 5 to 7 are views, corresponding to FIGS. 2 to 4, of a modified embodiment of a frame arrangement according to the invention, taken along lines II—II, III—III and IV—IV, respectively, in FIG. 1.
Figure 6:
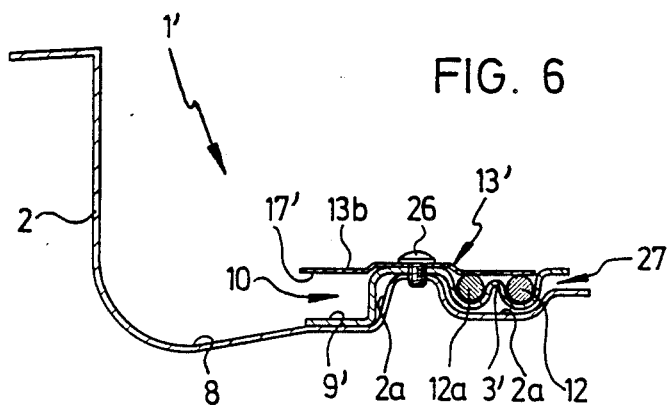
Figure 7:
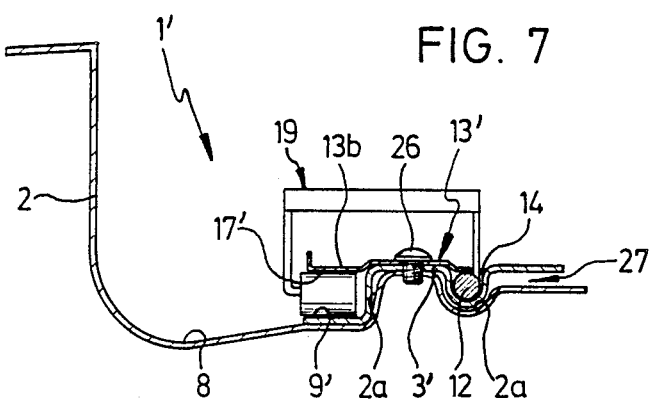

In FIGS. 5 to 7, a modified embodiment of a frame arrangement designated, overall, by 1' is shown and explained, in which the parts that are the same or similar to those in the preceding figures are provided with the same reference symbols, while parts that differ with regard to their material selection and/or their construction, but have similar functions, are distinguished by prime (') designations.

As an essential difference from the embodiment described above, that of FIGS. 5 to 7 utilizes a guide insert 3', which is incorporated into recesses 2a of frame 2, that is formed of metal, suitably sheet metal. This guide insert 3' of sheet metal forms lower sliding surface 9' of the tracks, designated overall by 10, and carries a covering 13' which also is formed of metal in this example. This covering 13' forms top sliding surface 17' of tracks 10. Further, covering 13' is a cover rail that covers guide channels 11, 15, and 11, 16, as in the example explained above. Additionally, in frame arrangement 1' according to FIGS. 5 to 7, guide 27 for the sliding inside roof headliner panel is defined on the bottom by frame 2 and on the top by guide insert 3'.

The embodiment of frame arrangement 1' explained relative to FIGS. 5 to 7, has, in comparison to the one explained initially, a greater inherent rigidity, since guide insert 3' and covering 13' consist entirely of metal. Also, here no difficulties can result due to temperature influences, since the interacting materials have essentially the same thermal expansion coefficient.

Although not represented, features of both embodiments of frame arrangements 1 and 1', explained above, can be combined with one another interchangeably.

This means, for example, that guide insert 3' can be produced of metal and covering 13, or at least several sections 13a, 13b of covering 13 can be produced of plastic. On the other hand, guide insert 3 could also be produced of plastic and be constructed corresponding to FIGS. 1 to 4, while ' covering 13' or sections 13a, 13b of covering 13' are formed of metal. As a function of the kind of stress anticipated, material pairings can, thus, be selected so that parts to be subjected to higher stresses are produced of metal and those which will experience lower stresses made of plastic. Also, considerations regarding reliable operational guiding of guide element 19 in tracks 10 can be taken into account in the material pairings, so that, for example, at least side sections 13b can be produced of metal and metal part 30, shown in FIGS. 3 and 4, can be omitted. Since front side section 13a of covering 13 is the least stressed of all parts, a construction of plastic suitably lends itself here.

Of course the invention is not limited to the preferred embodiments represented, but modifications are, of course, possible, especially with regard to material selection or the mutual matching of the materials of the parts, which will be apparent to the man skilled in the art. Also, of course, instead of connections using screws 26, other types of connections with frame 2 can be provided, and they can involve, for example, clip connections, clamp connections or the like.

As the embodiments above have shown, a frame arrangement 1 or 1' is provided in which frame 2 has only a support function, so that it can be prefabricated and, optionally, be incorporated into the vehicle roof as it is prepared with the roof opening by the manufacturer. The unit consisting of guide insert 3 or 3' and covering 13 or 13' with the cover panel and associated actuation elements representing a fully functional installation unit for the roof construction which can be operationally tested, handled, and mounted without regard to the provision of frame 2. In case of the need for repair, the installation unit, constructed in this way, can be completely removed and replaced by a new one while the frame remains fixed in place, simplifying and reducing the cost of such a replacement. On the other hand, the installation unit, depending on the customer's wish, can be adapted to suit differing requirements with regard to the functional possibilities, for example guides 27 for the sliding inside roof headliner can be omitted if one is not desired, yet the same frame 2 may still be used. In this way, because the functional installation unit can be adapted, without difficulties, to the circumstances required in each case while frame 2 can be retained, unchanged, it is possible to obtain the benefit of being able to provide installation units with different functional possibilities to a manufacturer or vehicle dealer that can be interchangeably installed and/or replaced in a simplified process.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Frame arrangement for a vehicle roof of the type having a roof opening in a fixed roof surface, a cover panel for closing and at least partially opening said roof opening, at least one guide element on each of opposite lateral sides of the cover panel which is slidable in a respective guide track at each side of the roof opening, an actuating cable connected to each guide element and disposed in a respective cable guide channel for producing displacement of the cover panel, and a sheet metal support frame which is connected to the fixed roof surface and supports the cover, tracks and cable guide channels with each cable guide channel running along a respective lateral side part of the frame, across a front part of the frame and terminating in a channel extension for a trailing section of the actuating cable that is located on a forward corner section of an opposite lateral side part of the frame, and said frame also forming a peripherally extending drip molding between a raised circumferential edge of the frame and an inner, at least partially circumferentially extending, upstanding ridge that is formed by an inverted generally U-shaped formation of the frame; wherein, for producing a smooth and quiet actuating and guiding of the actuating cables and guide elements, an upwardly open part of said cable guide channels and an upwardly facing lower sliding surface of the tracks are formed by a guide insert which has an inverted, generally U-shaped portion which straddles said upstanding ridge on the lateral side parts of said frame with each track being located on one side of the upstanding ridge of the frame and with the cable guide channels running adjacent each other on an opposite side of said upstanding ridge; and wherein a covering is mounted on said guide insert, said covering closing the upwardly open part of the lateral cable guide channels and forming a downwardly facing upper sliding surface of the tracks.

2. Frame arrangement according to claim 1, wherein said covering mounted on said guide insert is divided into a front side section having corner portions, and side sections, each of which forms a respective cover rail.

3. Frame arrangement according to claim 2, wherein a guide pin is integrated, as an insert, into the side sections of said covering.

4. Frame arrangement according to claim 1, wherein said guide insert is formed of a thermoplastic material.

5. Frame arrangement according to claim 4, wherein side sections of said covering are formed of a sheet metal part.

6. Frame arrangement according to claim 4, wherein side sections of said covering are formed of a plastic part.

7. Frame arrangement according to claim 4, wherein side sections of said covering are formed of a combination of plastic and metal parts.

8. Frame arrangement according to claim 6, wherein safety detents are provided on said covering.

9. Frame arrangement according to claim 6, wherein a catch projection is formed on a front section of said covering.

10. Frame arrangement according to claim 2, wherein a catch projection for the cover panel is provided on the front side section of said covering.

11. Frame arrangement according to claim 2, wherein at least one of the sliding surfaces of said tracks is constructed of a metal part.

12. Frame arrangement according to claim 11, wherein said metal part is a flat sheet metal part located between said covering and said guide insert.

13. Frame arrangement according to claim 2, wherein said guide insert, at least in the area of the side parts of the frame, has a stiffening rib that is braced on the frame at said opposite side of said ridge.

14. Frame arrangement according to claim 13, wherein said stiffening rib is formed on the guide insert.

15. Frame arrangement according to claim 14, wherein said guide insert is formed of a thermoplastic material.

16. Frame arrangement according to claim 1, wherein said guide insert is formed of sheet metal.

17. Frame arrangement according to claim 16, wherein side sections of said covering are formed of a sheet metal part.

18. Frame arrangement according to claim 1, wherein said guide insert is formed of a thermoplastic material; and wherein a sheet metal part is disposed between said covering and said guide insert, said sheet metal part forming, a reinforcement for said covering and said upper sliding surface of the track for said guide element.

19. Frame arrangement according to claim 18, wherein said guide insert, at least in the area of the side parts of the frame, has a stiffening rib that is braced on the frame at said opposite side of said ridge.

20. Frame arrangement according to claim 1, wherein said guide insert also forms guides for a sliding inside roof headliner in conjunction with an upper surface of said frame.

* * * * *